(12) United States Patent
Aybay

(10) Patent No.: US 9,258,229 B2
(45) Date of Patent: *Feb. 9, 2016

(54) SYSTEMS AND METHODS FOR ACCESSING A MULTI-BANK SRAM

(71) Applicant: Juniper Networks, Inc., Sunnyvale, CA (US)

(72) Inventor: Gunes Aybay, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/317,110

(22) Filed: Jun. 27, 2014

(65) Prior Publication Data

US 2014/0307739 A1    Oct. 16, 2014

Related U.S. Application Data

(63) Continuation of application No. 12/049,656, filed on Mar. 17, 2008, now Pat. No. 8,787,376.

(51) Int. Cl.
| | | |
|---|---|---|
| *H04L 12/28* | (2006.01) | |
| *H04L 12/743* | (2013.01) | |
| *H04L 12/701* | (2013.01) | |
| *G06F 13/16* | (2006.01) | |

(52) U.S. Cl.
CPC ............ *H04L 45/7457* (2013.01); *G06F 13/16* (2013.01); *H04L 12/28* (2013.01); *H04L 45/00* (2013.01)

(58) Field of Classification Search
CPC ..... H04L 45/00; H04L 45/7467; H04L 45/74; H04L 45/742; H04L 45/745; H04L 45/38; G06F 12/00; G06F 12/02
See application file for complete search history.

(56) References Cited

U.S. PATENT DOCUMENTS

| | | |
|---|---|---|
| 5,490,258 A | 2/1996 | Fenner |
| 6,658,002 B1 | 12/2003 | Ross et al. |
| 6,717,946 B1 | 4/2004 | Hariguchi et al. |
| 6,757,746 B2 | 6/2004 | Boucher et al. |
| 6,798,777 B1 | 9/2004 | Ferguson et al. |
| 6,862,281 B1 | 3/2005 | Chandrasekaran |
| 7,002,965 B1 | 2/2006 | Cheriton |
| 7,177,276 B1 | 2/2007 | Epps et al. |
| 7,190,696 B1 | 3/2007 | Manur et al. |

(Continued)

FOREIGN PATENT DOCUMENTS

WO    WO 01/63852    8/2001

OTHER PUBLICATIONS

Co-pending U.S. Appl. No. 12/049,656, filed Mar. 17, 2008 by Gunes Aybay entitled "Systems and Methods for accessing a multi-bank SRAM", 32 pages.

*Primary Examiner* — Brian O'Connor
(74) *Attorney, Agent, or Firm* — Harrity & Harrity, LLP

(57) ABSTRACT

A device may include at least one processor which may access, using a lookup key, a ternary content addressable memory to acquire a lookup result that includes information identifying a group of addresses for accessing a group of static random access memories. The at least one processor may parse the lookup result to identify the group of addresses and may simultaneously access, using the group of addresses, the group of static random access memories, to simultaneously read data from the group of static random access memories. The at least one processor may process a group of packets based on the data.

20 Claims, 6 Drawing Sheets

(56) References Cited

U.S. PATENT DOCUMENTS

| | | | | |
|---|---|---|---|---|
| 7,516,119 | B1 | 4/2009 | Kao | |
| 7,522,521 | B2 * | 4/2009 | Bettink | H04L 45/00 370/230 |
| 7,552,275 | B1 * | 6/2009 | Krishnan | G06F 17/30982 365/49.1 |
| 7,796,594 | B2 | 9/2010 | Melman et al. | |
| 7,809,009 | B2 | 10/2010 | Tatar et al. | |
| 7,860,097 | B1 | 12/2010 | Lovett et al. | |
| 7,864,791 | B2 | 1/2011 | Tatar et al. | |
| 7,908,431 | B2 * | 3/2011 | Krishnan | G06F 17/30982 709/238 |
| 7,941,606 | B1 * | 5/2011 | Pullela | H04L 69/22 711/128 |
| 7,957,384 | B2 | 6/2011 | Kelley | |
| 8,089,961 | B2 * | 1/2012 | Sahni | H04L 45/00 370/389 |
| 8,144,705 | B1 * | 3/2012 | Aybay | H04L 49/3009 370/252 |
| 8,787,376 | B1 * | 7/2014 | Aybay | H04L 12/28 370/389 |
| 2002/0110122 | A1 | 8/2002 | Ramfelt et al. | |
| 2002/0146009 | A1 | 10/2002 | Gupta et al. | |
| 2003/0037042 | A1 | 2/2003 | Kametani | |
| 2004/0030802 | A1 | 2/2004 | Eatherton et al. | |
| 2004/0109451 | A1 | 6/2004 | Huang et al. | |
| 2005/0018682 | A1 | 1/2005 | Ferguson et al. | |
| 2005/0165958 | A1 | 7/2005 | Uzawa et al. | |

\* cited by examiner

SYSTEMS AND METHODS FOR ACCESSING A MULTI-BANK SRAM

RELATED APPLICATION

This application is a continuation of U.S. patent application Ser. No. 12/049,656, filed Mar. 17, 2008, which is incorporated herein by reference.

BACKGROUND INFORMATION

Network devices, such as switches or routers, may be used not only to route and/or switch data packets to their destinations, but may also be used to collect information and perform actions on received and/or transmitted data packets. Existing network devices that perform multiple actions on data packets must typically wait for multiple memory read operations to be processed in order to determine the multiple actions that need to be performed on the data packets.

SUMMARY

According to one aspect, a device may be provided. The device may include a packet processor for receiving a packet and extracting information from the received packet to form a lookup key; a ternary content addressable memory (TCAM) for using a lookup key received from the packet processor to output a lookup result that includes a first number of addresses; and multi-bank static random access memory (SRAM) logic configured to: receive the lookup result from the TCAM, parse each of the first number of addresses from the received lookup result, simultaneously provide at least one of the first number of addresses to each of a first number of static random access memories (SRAMs), simultaneously read data from each of the first number of SRAMs using the provided address, and simultaneously transmit the read data from each of the first number of SRAMs to the packet processor.

According to another aspect, a method may be provided. The method may include receiving an lookup result that includes a first number of addresses; parsing each of the first number of addresses from the received lookup result; simultaneously providing at least one of the first number of parsed addresses to each of a first number of static random access memories (SRAMs); simultaneously reading data from each of the first number of SRAMs using the provided at least one address; and simultaneously transmitting the read data from each of the first number of SRAMs.

According to another aspect, a device may be provided. The device may include: means for receiving a lookup result from a ternary content addressable memory (TCAM) that includes a first number of addresses; means for simultaneously providing the first number of addresses to a first number of static random access memories (SRAMs); and means for simultaneously transmitting data read from each of the first number of SRAMs to a packet forwarding engine (PFE) via a second number of buses, where the first number is two or four times larger than the second number.

BRIEF DESCRIPTION OF THE DRAWINGS

The accompanying drawings, which are incorporated in and constitute a part of this specification, illustrate embodiments described herein and, together with the description, explain the embodiments. In the drawings.

DETAILED DESCRIPTION

The following detailed description refers to the accompanying drawings. The same reference numbers in different drawings may identify the same or similar elements. In addition, while some of the following description is provided mainly in the context of routers or other network elements at layer 2 and/or layer 3 of the Open Systems Interconnection (OSI) Model, the description provided herein may be applied to different types of network devices at different layers of communication (e.g., a Multi-protocol label switching (MPLS) routers, a Synchronous Optical Network (SONET) add-drop multiplexers, a Gigabit Passive Optical network (GPONs) switches, a Synchronous Digital Hierarchy (SDH) network elements, etc.).

In the following, a system may create and update a flow table of statistics based on received packets. The system may also sample received packets. In addition, the system may transmit the information stored in the flow table to an external device for processing and/or analysis. The embodiments described herein may also apply to non-packet data (e.g., cells, frames, etc.).

Figure 1:
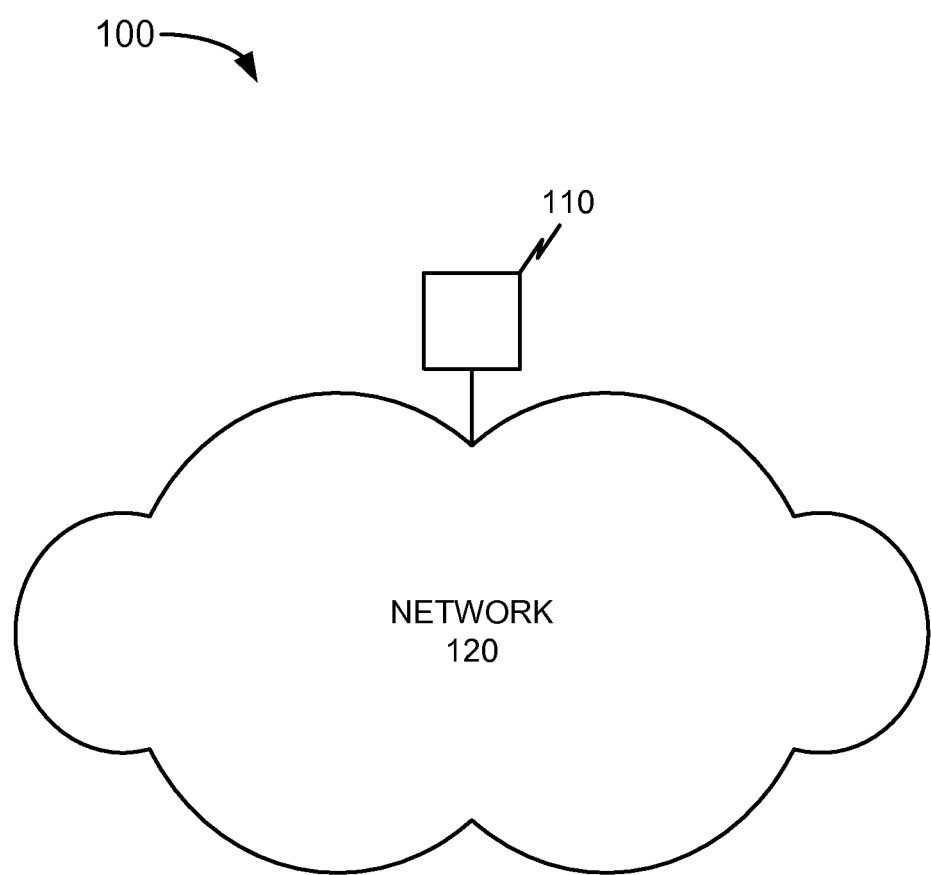
FIG. 1 shows a network in which concepts described herein may be implemented.

FIG. 1 shows an exemplary network in which concepts described herein may be implemented. As shown, network 100 may include network element 110 and a network 120. In practice, network 100 may include additional elements than those illustrated in FIG. 1. Network element 110 may include a device for performing network-related functions, such as a router or a switch (e.g., a provider edge (PE) router in a MPLS network). Network 120 may include the Internet, an ad hoc network, a local area network (LAN), a wide area network (WAN), a metropolitan area network (MAN), a cellular network, a public switched telephone network (PSTN), any other network, or a combination of networks. Network element 110 may communicate with other network elements (not shown) in network 120 through a wired or wireless communication link.

Figure 2:
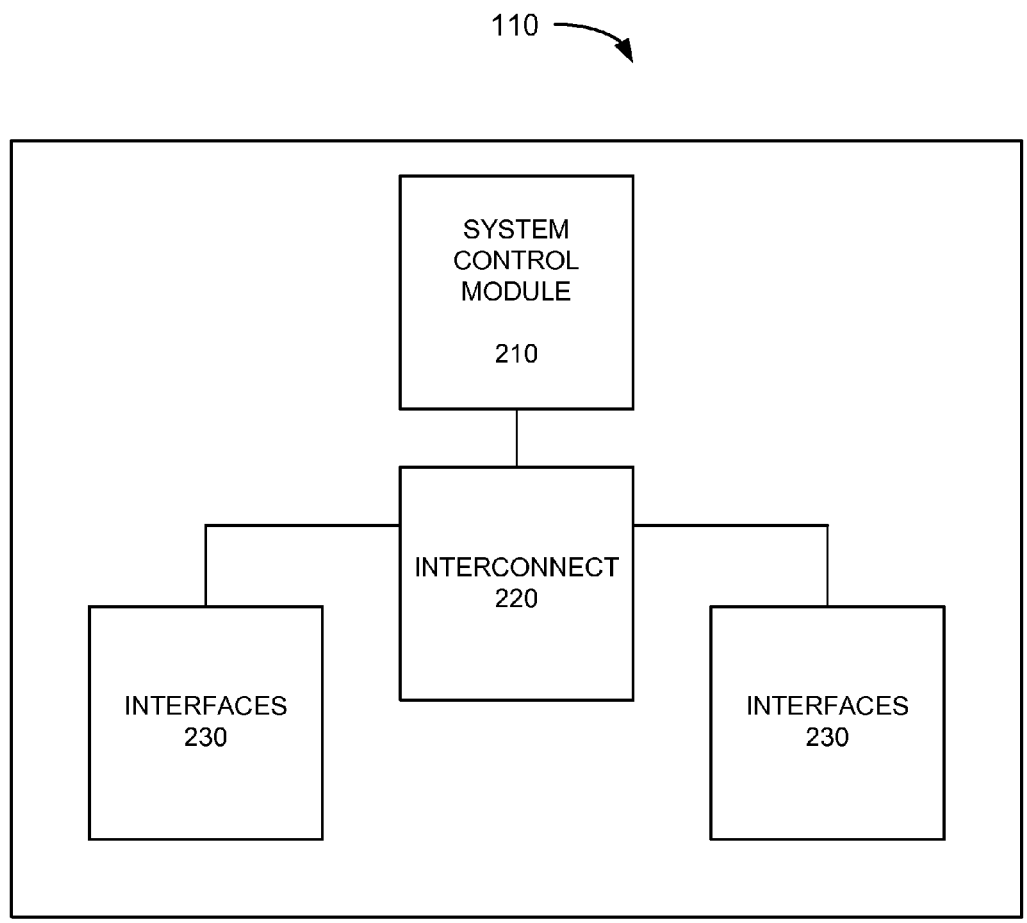
FIG. 2 is a block diagram of an exemplary device of FIG. 1.

FIG. 2 shows an exemplary block diagram of network element 110. As shown, network element 110 may include a system control module 210, interconnect 220, and interfaces 230. In other implementations, network element 110 may include fewer, additional, or different components than those illustrated in FIG. 2.

System control module 210 may include one or more processors, microprocessors, application specific integrated circuits (ASICs), field programming gate arrays (FPGAs), and/or processing logic that may be optimized for networking and communications. System control module 210 may perform high level management functions for network element 110. For example, system control module 210 may communicate with other networks and systems connected to network element 110 to exchange information regarding network topology. System control module 210 may create routing tables based on network topology information and create forwarding tables based on the routing tables and may send these tables to interfaces 230 for data packet routing. System control module 210 may also include a static memory (e.g. a read only memory (ROM)), a dynamic memory (e.g. a random access memory (RAM)), and/or onboard cache, for storing data and machine-readable instructions. System control module 210 may also include storage devices, such as a floppy disk, a CD ROM, a CD read/write (R/W) disc, and/or flash memory, as well as other types of storage devices.

Interconnect 220 may include one or more switches or switch fabrics for directing incoming network traffic, such as data packets, from one or more of interfaces 230 to others of interfaces 230. Interconnect 220 may also include processors, memories, and/or paths that permit communication among system control module 210 and interfaces 230.

Interfaces 230 may include devices or assemblies, such as line cards, for receiving incoming data packets from network links and for transmitting data packets to network links. In other examples, interfaces 230 may include Ethernet cards, optical carrier (OC) interfaces and asynchronous transfer mode (ATM) interfaces.

Depending on implementation, the components that are shown in FIG. 2 may provide fewer or additional functionalities. For example, if network element 110 performs an Internet Protocol (IP) packet routing function as part of a Multi-Protocol Label Switching (MPLS) router, system control module 210 may perform tasks associated with obtaining routing information from other routers in a MPLS network. In such cases, conveying network traffic from one interface to another may involve label based routing, rather than IP address based routing.

Figure 3:
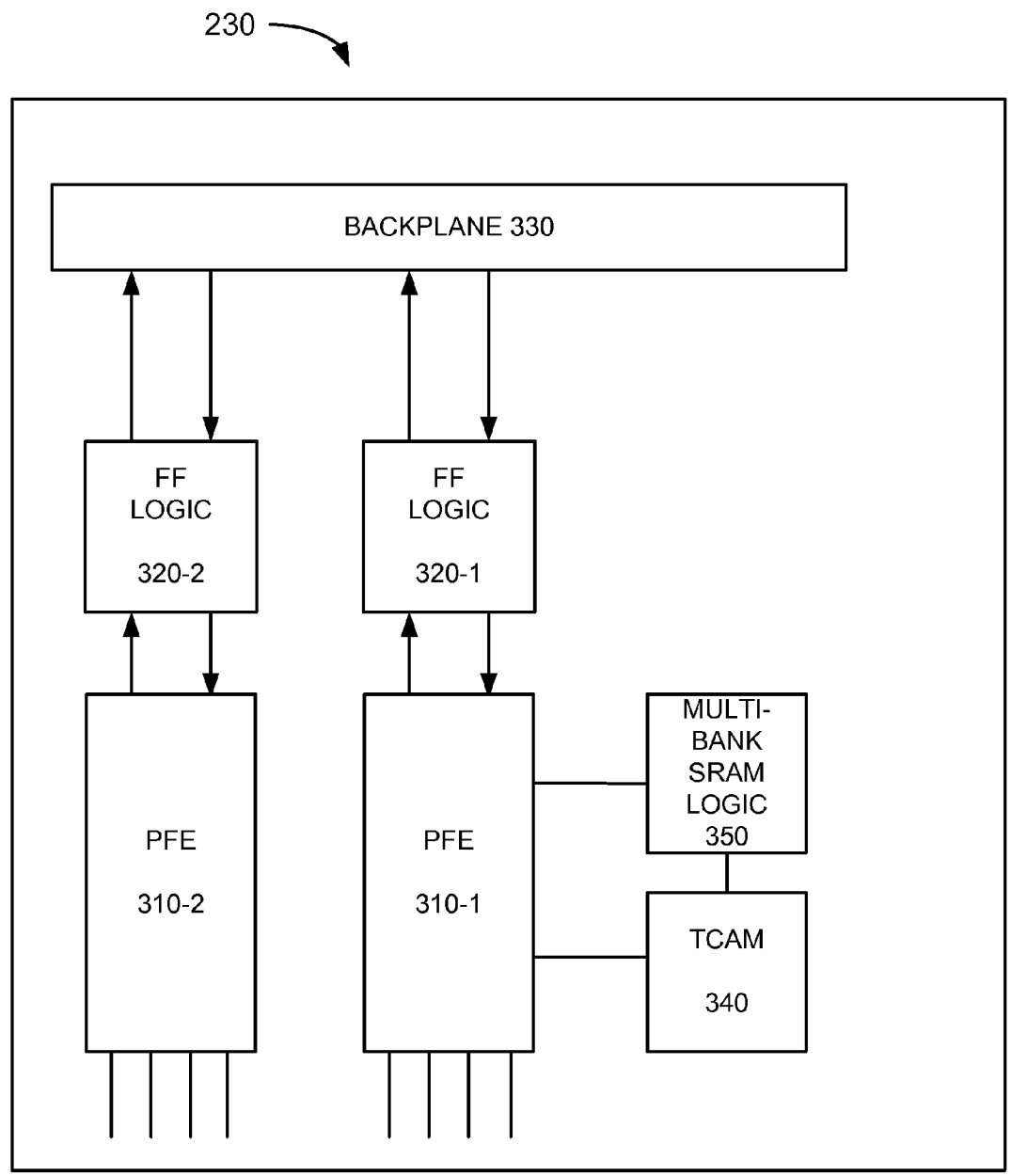
FIG. 3 is a block diagram of an exemplary interface of FIG. 2.

FIG. 3 is a block diagram of an exemplary interface 230 as shown in FIG. 2. As shown, interface 230 may include a number of packet forwarding engines (PFE) 310-1 and 310-2 (hereinafter collectively referred to as packet forwarding engines 310), a number of fabric and forwarding (FF) logic 320-1 and 320-2 (hereinafter collectively referred to as FF logic 320), backplane 330, ternary content addressable memory (TCAM), 340 and multi-bank static random access memory (SRAM) logic 350. In different implementations, interface 230 may include fewer, additional, or different components than those illustrated in FIG. 3.

Each packet forwarding engine (PFE) 310 may include hardware and/or software for receiving, storing, processing, and/or forwarding data packets. For example, PFE 310 may (also be referred to as a packet processor) process packets received from an incoming link and prepare packets for transmission on an outgoing link. PFE 310 may also perform route lookup based on packet header information to determine destination information for the packets. PFE 310 may include memories for storing received data packets. PFE 310 may also transmit received data packets to FF logic 320 for forwarding to backplane 330 based on determined data packet routing information. PFE 310 may also create a lookup key for each received data packet based on information included in the data packet header. For example, a lookup key may be created from a five-tuple of information included in a received data packet header. For example, numerical values in the packet header that relate to the source address, the destination address, the source port, the destination port and/or the protocol may be added or combined in some manner (e.g., hashing, etc.) to form a lookup key. The lookup key created by PFE 310 may be transmitted to TCAM 340 to access multi-bank SRAM logic 350 to determine actions to be performed on the received data packet. For example, PFE 310 may perform actions such as, prioritizing, sampling, counting a received data packet based on the information received from multi-bank SRAM logic 350.

Fabric and forwarding (FF) logic 320 may include hardware and/or software for receiving and storing data packets from PFE 310 and for forwarding received data packets to backplane 330. FF logic 320 may also receive data packets from backplane 330 and forward the data packet for processing by PFE 310.

Backplane 330 may include a switching fabric and/or memories for transmitting data packets to/from interconnect 220 (as shown in FIG. 2).

Figure 4:
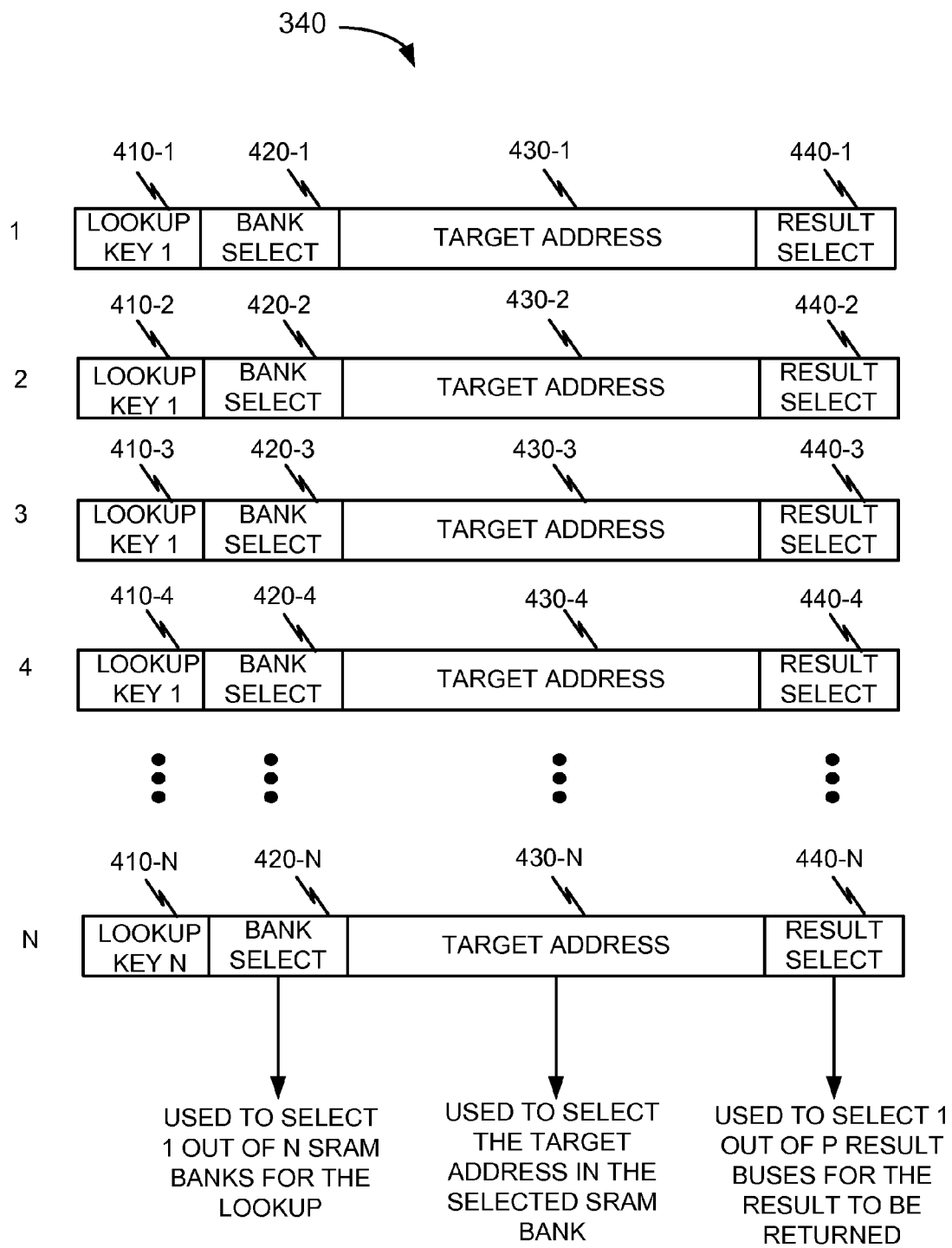
FIG. 4 illustrates exemplary data stored in TCAM 340 of FIG. 3.

Ternary content addressable memory (TCAM) 340 may include a high speed memory for receiving content and associating the received content with stored data. For example, TCAM 340 may receive content, such as the lookup key from PFE 310, and output the stored information associated with the received lookup key. As shown in FIG. 3, TCAM 340 may be connected to multi-bank SRAM logic 350 and provide the associated information, referred to as a lookup result, to multi-bank SRAM logic 350. The lookup result provided by TCAM 340 may include a number of addresses to be used to read data from within multi-bank SRAM logic 350. FIG. 4 shows exemplary data stored in TCAM 340 and will be described in additional detail below. In other embodiments, the lookup result provided from TCAM 340 to multi-bank SRAM logic 350 may include two fields of information.

Multi-bank static random access memory (SRAM) logic 350 may include a number of SRAM memory banks and hardware, software and/or firmware to provide access to the number of SRAM memory banks. For example, multi-bank SRAM logic 350 may be configured to receive a lookup result from TCAM 340 and simultaneously access (read from memory) a number of SRAM memory banks. Once data has been read from the number SRAM memory banks, multi-bank SRAM logic 350 may also simultaneously transmit the data read from the number of SRAM memory banks to the requesting PFE 310. Data stored in the number of SRAM memory banks contained in multi-bank SRAM logic 350 may include information used to identify actions to be taken by PFE 310 on received data packets.

FIG. 4 is a diagram of exemplary data stored in TCAM 340. As shown, each exemplary data entry (numbered 1-4 ... N) in TCAM 340 may include a lookup key field 410, where each lookup key field 410 may be associated with a bank select field 420, a target address field 430 and a result select field 440. Information in lookup key field 410 may be received by TCAM 340, as a lookup key, from PFE 310. Fields 420-440 associated with a lookup key field 410 may be output as part of a lookup result to multi-bank SRAM logic 350, as described below with reference to FIG. 5.

Lookup key field 410 may include programmed information used to identify a received packet. As described above, a received lookup key received from PFE 310 may be compared to information stored in lookup key field 410. If a matching lookup key field 410 is found (matching the received lookup key) information in fields 420-440 may be output from TCAM to multi-bank SRAM logic 350.

Figure 5:
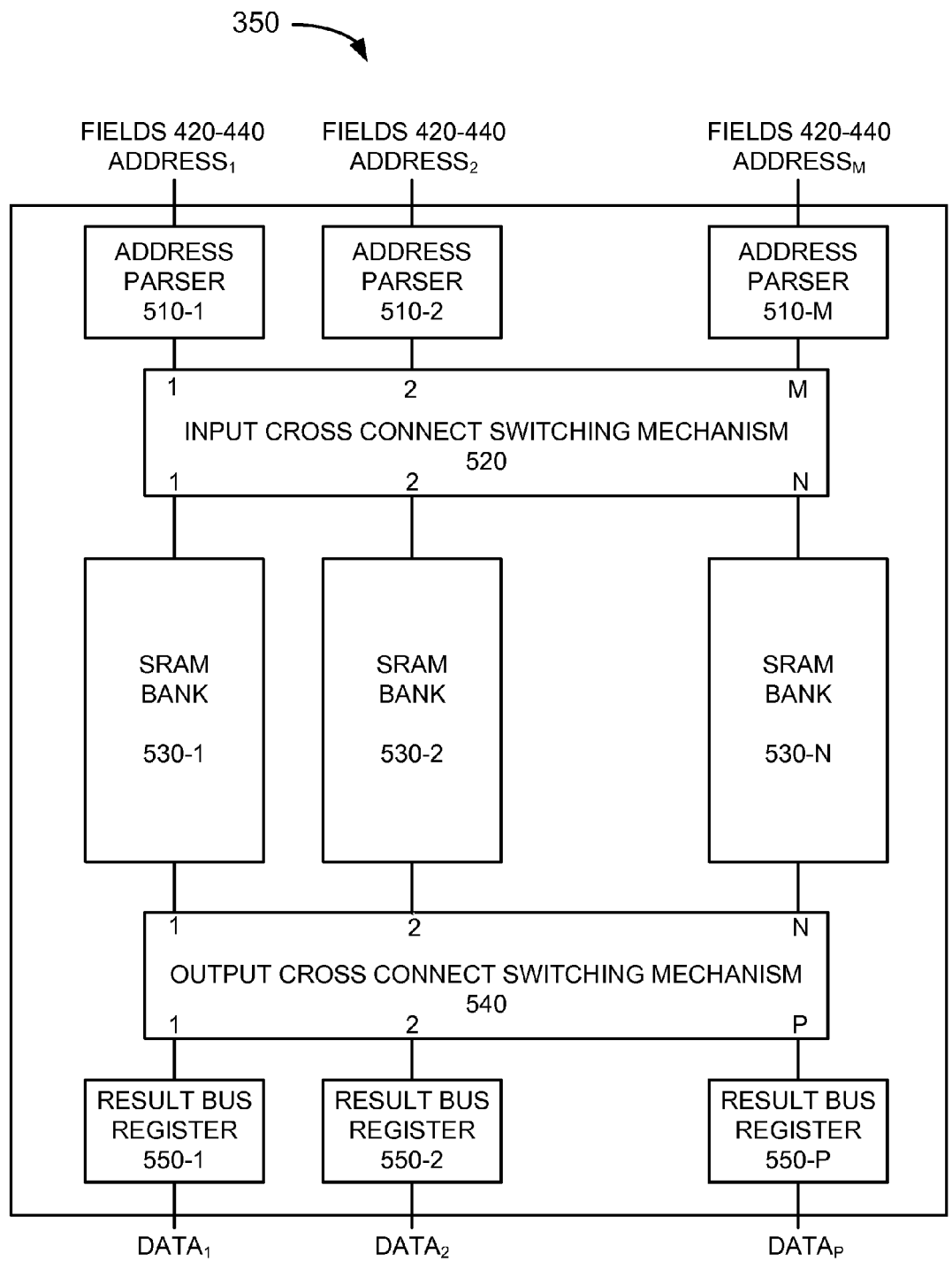
FIG. 5 is a block diagram of exemplary multi-bank SRAM logic of FIG. 3.

Bank select field 420 may contain information for identifying one of a number of SRAM memory banks within multi-bank SRAM logic 350. As shown in FIG. 5 for example, if there are four SRAM memory banks 530-1 to 530-4, bank select field 420 may contain two bits of information used to identify and select one of the four SRAM memory banks 530.

Target address field 430 may contain an address within an identified SRAM memory bank within multi-bank SRAM logic 350. As shown in FIG. 5 for example, target address field 430 may contain a 12 bit address for identifying an address within SRAM memory bank 430-2.

Result select field 440 may contain information for identifying one of a number of SRAM result buses within multi-bank SRAM logic 350. As shown in FIG. 5 for example, if there are four result bus registers 550, result select field 440 may contain two bits of information used to identify and select one of the four result bus registers 550.

Although shown as one group of data entries or a database, other embodiments of data stored in TCAM 340 may include multiple databases for example, where each database includes fields 410-440 as described above.

In other embodiments, the lookup result provided from TCAM 340 to multi-bank SRAM logic 350 may includes two fields of information, such as a lookup key field 410 and a target address field 430, where the other above fields (420 and 440) may be created from the two provided fields (410 and 430) in the lookup result using components described below with reference to FIG. 5.

FIG. 5 shows a functional block diagram of exemplary multi-bank SRAM logic 350. As shown, multi-bank SRAM 350 logic may include a number of address parsers 510-1 to 510-M (hereinafter collectively referred to as address parsers 510), an input cross connect switching mechanism 520, a number of SRAM memory banks 530-1 to 530-N (hereinafter collectively referred to as SRAM memory banks 530), an output cross connect switching mechanism 540 and a number of result bus registers 550-1 to 550-P (hereinafter collectively referred to as result bus registers 550). In different implementations, multi-bank SRAM 350 logic may include fewer, additional, or different components than those illustrated in FIG. 5. It should also be understood that the number "M" of address parsers 510, the number "N" of SRAM banks 530 and the number "P" of result bus registers 550 may all be different in number.

It should be understood that TCAM 340 may connect to multi-bank SRAM logic 350 via a one bus connection, a two bus connection, or a four bus connection. It should also be understood that the number "M" of address parsers 510 may be more than four. Assuming that there are four address parsers 510 (identified as 510-1 to 510-4), when there is a one bus connection between TCAM 340 and multi-bank SRAM logic 350, each of the four address parsers 510-1 to 510-4 receives a lookup result via a connection to the one bus. Assuming again that there are four address parsers 510 (identified as 510-1 to 510-4), when there is a two bus connection between TCAM 340 and multi-bank SRAM logic 350 the first bus connect to address parsers 510-1 and 510-2 and the second bus would connect to address parsers 510-3 and 510-4. Assuming again that there are four address parsers 510, when there is a four bus connection between TCAM 340 and multi-bank SRAM logic 350 each of the four buses connect to only one of address parsers 510-1 to 510-4. It is also understood that when using a one or two bus connection in the above examples, time-division multiplexing (TDM) techniques may be used to transmit four or two data words (information in fields 420-440) in one operation.

Address parsers 510 may include hardware and/or software for receiving and storing one or more lookup results from TCAM 340. Address parsers 510 may include additional hardware and/or firmware to perform arithmetic and logic operations on the lookup results that are received from the TCAM 340 to generate one or more results which are then passed on to one or more SRAM banks 530 through the input cross connect mechanism 520. For example, a lookup result may include information from fields 420-440 as shown in FIG. 4. As described above, when there is a four bus connection between TCAM 340 and multi-bank SRAM logic 350, each of the four buses connect to only one of address parsers 510-1 to 510-4. In this example, address parser 510-1 receives and stores information in fields 420-1 to 440-1, address parser 510-2 receives and stores information in fields 420-2 to 440-2, address parser 510-3 receives and stores information in fields 420-3 to 440-3, and address parser 510-4 receives and stores information in fields 420-4 to 440-4. In another example, when there is a two bus connection between TCAM 340 and multi-bank SRAM logic 350, address parsers 510-1 and 510-2 receive information in fields 420-1 to 440-1 and fields 420-2 to 440-2 via a first bus (while address parsers 510-3 and 510-4 receive information in fields 420-3 to 440-3 and fields 420-4 to 440-4 via a second bus). In this example, address parser 510-1 may parse or ignore information in fields 420-2 to 440-2, and store only the information in fields 420-1 to 440-1. Similarly, address parser 510-2 may parse or ignore information in fields 420-1 to 440-1 and store only the information in fields 420-2 to 440-2. In another example, when there is a one bus connection between TCAM 340 and multi-bank SRAM logic 350, each address parser 510 receives the lookup result that includes the information in four data entries (i.e. the information in fields 420-1 to 440-1, 420-2 to 440-2, 420-3 to 440-3 and 420-4 to 440-4). In this example, each address parser 510 may parse or ignore information in three entries of the received lookup result and store information in one entry (such as information in fields 420-1 to 440-1). For example, address parser 510-1 may ignore information in three entries of the received lookup result and store information in fields 420-1 to 440-1 while address parser 510-2 may ignore information in three entries of the received lookup result and store information in fields 420-2 to 440-2. Similarly, address parser 510-3 may ignore information in three entries of the received lookup result and store information in fields 420-3 to 440-3 and address parser 510-4 may ignore information in three entries of the received lookup result and store information in fields 420-4 to 440-4. In other embodiments, address parsers 510 may perform arithmetic and/or logical operations on fields 420 to 440, and/or create and supply more than one address to SRAM banks 530. For example, address parser 510-1 may send the target address field 430-1 without any modifications to SRAM bank 530-1 such that address field 430-1 received from TCAM 340 is used as the direct lookup address for the data in SRAM bank 530-1. Simultaneously, address parser 510-1 may add a fixed offset to the target address field 430-1 pass the resulting new address as the lookup address for the data in SRAM bank 530-2.

In still further examples, address parsers 510 may receive a lookup result from TCAM 340 that includes two fields of information, such as information in lookup key field 410 and information in target address field 430. Address parsers 510 may perform various types of arithmetic and logic operations to map target address fields 430 received from the TCAM 340 more effectively into data structures that are maintained in SRAM banks 530. Assume for example, that there are four SRAM banks 530 (referred to as databases A, B, C and D) each with 1024 addressable entries, and also assume that there are six databases included in TCAM 340, where two databases include 1024 entries (referred to as databases P and Q) and four databases that include 512 entries (referred to as databases R, S, T and U). In this example, address parsers 510 may use a information in a received lookup result (such as information in lookup key field 410) to form a bank select field 420 and result select field 440 of information as described above, and address parsers 510 may also determine whether or not to modify a received address (included in target address filed 430) based on the information in the received lookup result. In this example, address parsers 510 may use the received address (without modifying information in a received target address field 430) to directly map TCAM database P to SRAM database A, as each of the two databases (P and A) contains the same amount of addressable entries (1024). Similarly, address parsers 510 may use the received address (without modifying information included in a received target address field 430) to directly map TCAM database Q to SRAM database B, as each of the two databases (Q and B) contains the same amount of addressable entries (1024). Continuing with this example, an address received from TCAM database R may be directly mapped to the first 512 addresses of SRAM database C, while an address received from TCAM database S may be mapped to the last 512 addresses of SRAM database D by adding 512 (100000000 in binary) to the received address from database S. In a similar manner, an address received from TCAM database T may be directly mapped to the first 512 addresses of SRAM database D, while an address received from TCAM database U may be mapped to the last 512 addresses of SRAM database D by adding 512 (100000000 in binary) to the received address from database U. In this manner, address parsers 510 may use information in the received lookup result to determine what if any operation may be performed on a received target address to be sent to SRAM banks 530. As described above, address parsers 510 may be programmed (to be configured to an a priori configuration by system control module 210, for example) to add/subtract bits and/or perform logical operations on received address information or may add/subtract bits and/or perform logical operations on received address information based on the received information from TCAM 340. In other embodiments, address parsers 510 may be programmed to add/subtract bits and/or perform logical operations on received address information based on a combination of both an a priori configuration and received information from TCAM 340. It should be understood that in other examples, the number of databases and sizes of the databases included in TCAM 340 and SRAM banks 530 may vary. In each specific case, address parsers 510 may be programmed to add/subtract bits and/or perform logical operations on received address information in order to map received target addresses from TCAM 340 to SRAM banks 530.

In still further examples, address parsers 510 may left shift bits of information in a received target address based on the sizes of data structures stored in SRAM banks 530. For example, SRAM banks 530 may store 8 bytes of information at each addressable entry or may store 32 bytes of information at each addressable entry. Based on the sizes of the data stored in the SRAM banks 530, address parsers 510 may left shift received bits as necessary to accommodate for the varying sizes of the stored data structures. It is understood that in all the above examples, address parsers 510 output fields 420-440 to be processed by the components as described below.

Input cross connect switching mechanism 520 may include hardware and/or software that may interconnect address parsers 510 with SRAM memory banks 530. For example, input cross connect switching mechanism 520 may include a number of input ports (equal to the number of address parsers 510) where each input port receives information included in a bank select field 420, a target address field 430 and a result select field 440. Input cross connect switching mechanism 520 may use information in bank select field 420 to connect received information in an input port to a selected SRAM memory bank 530 via an output port. For example, input port 1 of input cross connect switching mechanism 520 may transmit received information (included in fields 420-1 to 440-1) to output port 2 of input cross connect switching mechanism 520, when information in bank select field 420-1 identifies SRAM 530-2. Input cross connect switching mechanism 520 may be implemented using many different techniques. For example, input cross connect switching mechanism 520 may include busses, crossbars, and/or shared memories. In these implementations, input cross connect switching mechanism 520 may provide multiple simultaneous data paths to interconnect address parsers 510 with SRAM memory banks 530. Input cross connect switching mechanism 520 may also be programmed and/or configured by system control module 210 to statistically assign address information received input from an address parser 510 to a specific SRAM bank 530.

In one implementation, SRAM banks 530 may include an addressable memory. For example, SRAM memory banks 530 may receive an address (included in target address field 430) and read stored data from the received address. SRAM memory banks 530 may also output the data read from the received address to output cross connection switching mechanism 540. Data stored in SRAM memory banks 530 may be used by PFE 310 to identify an action to be taken on a received data packet.

Output cross connect switching mechanism 540 may include hardware and/or software that may receive information from SRAM memory banks 530 and may transmit the received information to result bus registers 550. For example, output cross connect switching mechanism 540 may include a number of input ports (equal to the number of SRAM banks 530) where each input port receives information such as data read from an address within an SRAM bank 530 and a result select field 440. Output cross connect switching mechanism 540 may use information in result select field 440 to connect received information in an input port to a selected result bus register 550 via an output port. For example, input port 1 of output cross connect switching mechanism 540 may transmit received information to output port 2 of output cross connect switching mechanism 540, when information in result select field 440 identifies result bus register 550-2. Output cross connect switching mechanism 540 may be implemented using many different techniques. For example, output cross connect switching mechanism 540 may include busses, crossbars, and/or shared memories. In these implementations, output cross connect switching mechanism 540 may provide multiple simultaneous data paths to interconnect SRAM banks 530 with result bus registers 550. Output cross connect switching mechanism 540 may also be programmed and/or configured by system control module 210 to statistically assign information received input from an SRAM bank 530 to a specific result bus register 550.

Result bus registers 550 may include hardware and software to receive, store and process information for transmission to PFE 310 via a corresponding data bus. For example, result bus register 550-1 may receive information read from an address in SRAM 530-2 and transmit this information via a data bus to PFE 310. The information transmitted from result bus registers 550 in multi-bank SRAM logic 350 may be transmitted to PFE 310 using one of a number of embodiments. For example, multi-bank SRAM logic 350 may be connected to PFE 310 via a one bus connection, a two bus connection, or a four bus connection. Assuming that there are four result bus registers 550 (identified as 550-1 to 550-4), when there is a one bus connection between multi-bank SRAM logic 350 and PFE 310, each of the four result bus registers 550-1 to 550-4 transmit read data via the one bus connection. Assuming again that there are four result bus registers 550 (identified as 550-1 to 550-4), when there is a two bus connection between multi-bank SRAM logic 350 and PFE 310, the first bus transmits data from result bus registers 550-1 and 550-2 and the second bus transmits information from result bus registers 550-3 and 550-4. Assuming again that there are four result bus registers 550, when there is a four bus connection between multi-bank SRAM logic 350 and PFE 310, each of the four buses connect to only one of the result bus registers 550. It is also understood that when using a one or two bus connection in the above examples, time-division multiplexing (TDM) techniques may be used to transmit four or two read data words in one operation.

Figure 6:
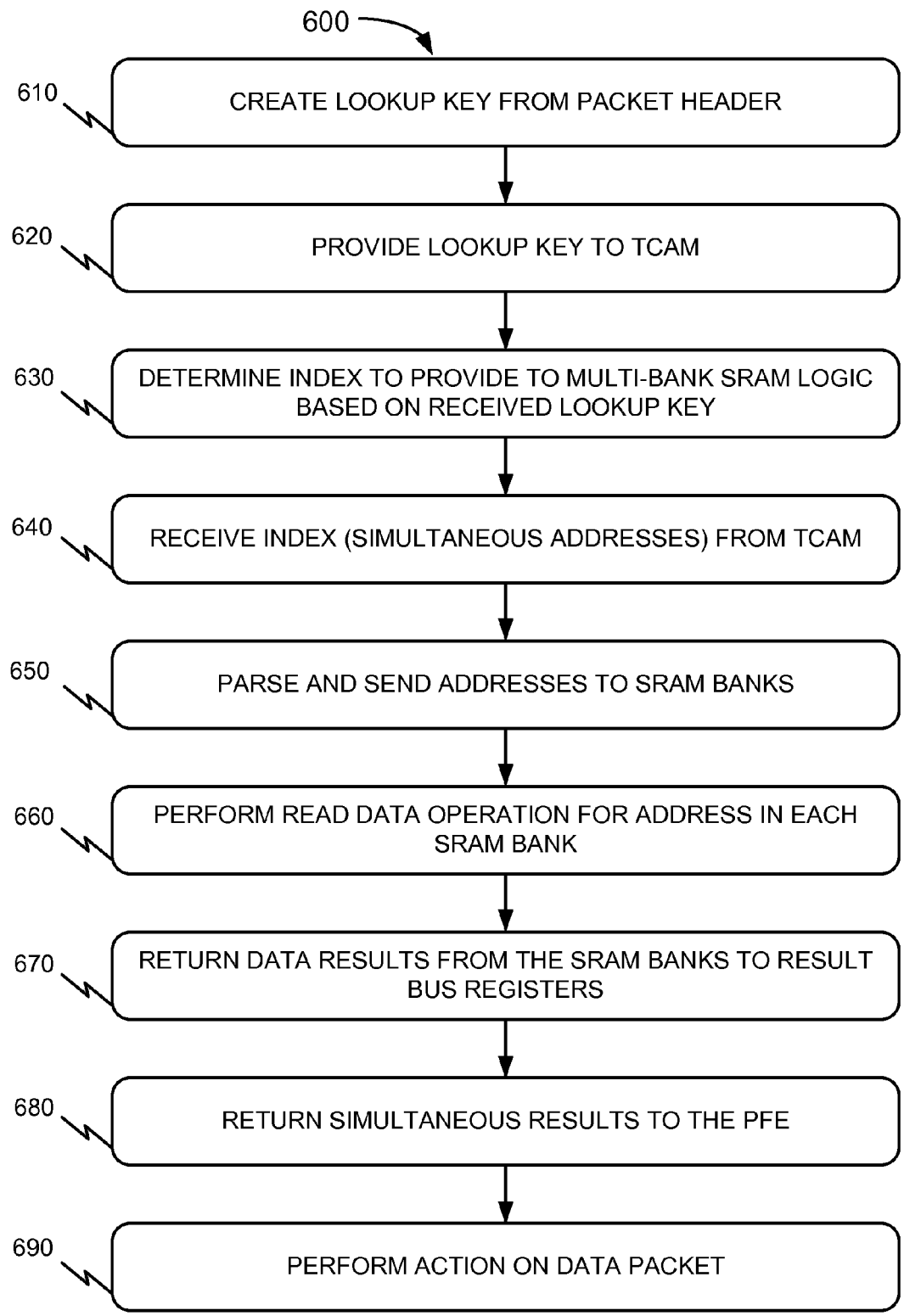
FIG. 6 is a flowchart of an exemplary multi-bank SRAM reading process.

FIG. 6 shows an exemplary multi-bank SRAM reading process 600. Process 600 may begin upon creation of a lookup key by, for example, PFE 310 (block 610). As described above for example, a lookup key may be created by PFE 310 using information included in a received packet header. The lookup key may then be provided to TCAM 340 from PFE 310 (block 620). Using the received lookup key, TCAM 340 may then determine a lookup result to be provided to multi-bank SRAM logic 350 (block 630). As described above, a received lookup key may be compared to information stored in lookup key field 410 in TCAM 340. As shown in FIG. 4 for example, a single lookup key (such as "lookup key 1" stored in lookup key fields 410-1 to 410-4) may be included in four entries in TCAM 340. In this example, the information stored in these four entries (other than the information in the lookup key field 410) may be determined as a lookup result to output to multi-bank SRAM logic 350 (block 630). For example, the lookup result may include the information stored in fields 420-1 to 440-1, 420-2 to 440-2, 420-3 to 440-3 and 420-4 to 440-4. In other examples, the lookup result may include information in fields 410 and 430, where fields 420 and 440 may be produced by address parsers 510, as described above.

Continuing with this example, where the values of M, N and P as shown in FIG. 5 are equal to 4, the lookup result may be output from TCAM 340 and received by multi-bank SRAM logic 350 (block 640). As described above, the lookup result may be received by address parsers 510-1 to 510-4 over four individual buses, two buses, or one bus. After receiving the lookup result from TCAM 340, the addresses are parsed and sent to the SRAM banks (block 650). For example, address parser 510-1 may parse and store information included in fields 420-1 to 440-1 from the received lookup result. Similarly, address parser 510-2 may parse and store information included in fields 420-2 to 440-2, while address parsers 510-3 and 510-4 may parse and store information included in fields 420-3 to 440-3 and 420-4 to 440-4 respectively, from the received lookup result. In other examples, when the lookup result contains information in fields 410 and 430, information in bank select field 420 and result bus field 440 may be created by address parsers 510, as described above. Using the information in bank select field 420, input cross connect switching mechanism 520 may send the target address (stored in target address field 430) to the selected SRAM bank 530 (block 650). For example, input cross connect switching mechanism 520 may send target address 430-1 (received at input port 1 from address parser 510-1) to SRAM bank 530-2 via output port 2. In a similar manner, input cross connect switching mechanism 520 may simultaneously send target address 430-2 (received at input port 2 from address parser 510-2) to SRAM bank 530-1 via output port 1.

Using the received target address, each SRAM bank 530 may perform a data reading operation (block 660). Continuing with the above example, data stored in target address 430-1 within SRAM bank 530-2 may be read. Similarly, data stored in target address 430-2 within SRAM bank 530-1 may be read. In this example, read data operations may all be performed simultaneously in SRAM banks 530 for each target address 430. After data has been read from each SRAM bank 530, the results may be returned to result bus registers (block 670). For example, using information included in result bus field 440, output cross connect switching mechanism 540 may send the read data from an SRAM bank 530 to an identified result bus register 550 (block 670). For example, information in result select field 440-1 may identify result bus register 550-1, where output cross connect switching mechanism 540 may send the read data from an SRAM bank 530-2 to result bus register 550-1. After read data has been received by each result bus register 550, the data may be simultaneously transmitted to PFE 310-1 (block 680). As described above for example, the data may be transmitted from result bus registers 550 to PFE 310-1 via four individual buses or may be time division multiplexed over one or two buses (block 680). PFE 310-1 may then use the received data to determine actions to be taken on received data packets (block 690). As described above, the actions PFE 310-1 may perform on a received data packet include sampling the data packet, counting the data packet and prioritizing the data packet.

In other examples, TCAM 340 and multi-bank SRAM logic 350 may be connected to a number of PFEs 310. For example, TCAM 340 and multi-bank SRAM logic 350 may be connected to both PFEs 310-1 and 310-2. In this example, TCAM 340 may receive a lookup key from PFE 310-1 and a lookup key from PFE 310-2. TCAM 340 may then output two data entries for each lookup key to multi-bank SRAM logic 350. For example, when TCAM 340 is connected to multi-bank SRAM logic 350 via a two bus connection, one bus may connect to address parsers 510-1 and 510-2, while the second bus may connect to address parsers 510-3 and 510-4. In this manner, a lookup result may be simultaneously received from two PFEs 310. Continuing with this example, data may be read from SRAM banks 530 and simultaneously returned to PFEs 310-1 and 310-2. For example, result bus registers 550-1 and 550-2 may connect and transmit data to PFE 310-1 (via one bus) while result bus registers 550-3 and 550-4 may connect and transmit data to PFE 310-2 (via another bus). PFEs 310-1 and 310-2 may then perform actions on data packets based on the data received from multi-bank SRAM logic 350.

In another example, each address parser 510 may modify a single received address (included in field 430) to produce multiple addresses to be supplied to SRAM banks 530. For example, each address parser 510 may shift all bits in a received address to the left and may also shift all bits in a received address to the right to produce two different addresses. In this example, each of these two addresses may be sent to an SRAM bank 530. In this example, the number "M" of address parsers 510 may be equal to 4, the number "N" of SRAM banks 530 may be equal to 8, and the number "P" of result bus registers 550 may be equal to 8.

As described above, the embodiments allow for multiple simultaneous SRAM read operations to be performed from one received lookup result. Additionally, the embodiments allow the multiple data results to be simultaneous transmitted to a PFE to perform actions on received data packets. The foregoing description of implementations provides an illustration, but is not intended to be exhaustive or to limit the implementations to the precise form disclosed. Modifications and variations are possible in light of the above teachings or may be acquired from practice of the teachings.

For example, while series of blocks have been described with regard to the processes illustrated in FIG. 6, the order of the blocks may be modified in other implementations. Further, non-dependent blocks may represent blocks that can be performed in parallel. For example, blocks 610-690 that are performed for one data packet may be independent of blocks 610-690 for a second data packet and, therefore, may be performed in parallel to blocks 610-690 for the second data packet. Further, it may be possible to omit blocks within a process. Additionally, processes of FIG. 6 may be performed in parallel.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
    at least one processor to:
        access, using a lookup key, a ternary content addressable memory to acquire a lookup result that includes information identifying a plurality of addresses for accessing a plurality of static random access memories;
        parse the lookup result to identify the plurality of addresses;
        simultaneously access, using the plurality of addresses, the plurality of static random access memories, to simultaneously read data from the plurality of static random access memories; and
        process a group of packets based on the data.

2. The device of claim 1, where the lookup result further includes:
    a quantity of entries,
        the quantity of entries corresponding to a quantity of static random access memories included in the plurality of static random access memories, and
        each entry, of the quantity of entries, including:
            a first field that includes information for identifying a packet of the group of packets, and
            a second field that includes an address of the plurality of addresses.

3. The device of claim 2, where the at least one processor, when simultaneously accessing the plurality of static random access memories, is further to:
    generate information for identifying a memory bank, within the plurality of static random access memories, based on the information for identifying the packet, and
    generate information for identifying a register for storing data read from the memory bank based on the address.

4. The device of claim 1, where the at least one processor, when simultaneously accessing the plurality of static random access memories, is further to:
    shift bits of information in the plurality of addresses based on a size of a data structure stored in the plurality of static random access memories.

5. The device of claim 1, where the at least one processor, when processing the group of packets, is to:
    determine, based on the data read from the plurality of static random access memories, one or more actions associated with processing the group of packets, and
    perform the one or more actions to process the group of packets.

6. The device of claim 5, where the one or more actions include at least one of:
    counting the group of packets,
    sampling the group of packets, or
    prioritizing the group of packets relative to other packets received by the device.

7. The device of claim 1, where, when simultaneously accessing the plurality of static random access memories, the at least one processor is to:
    simultaneously send each address, of the plurality of addresses, to a respective static random access memory of the plurality of static random access memories.

8. A non-transitory computer-readable medium storing instructions, the instructions comprising:
    one or more instructions that, when executed by at least one processor, cause the at least one processor to:
        access, using a lookup key, a ternary content addressable memory to acquire a lookup result that includes information identifying a plurality of addresses for accessing a plurality of static random access memories;
        parse the lookup result to identify the plurality of addresses;
        simultaneously access, using the plurality of addresses, the plurality of static random access memories, to simultaneously read data from the plurality of static random access memories; and
        process a group of packets using the data.

9. The non-transitory computer-readable medium of claim 8, where the lookup result further includes:
    a quantity of entries,
        the quantity of entries corresponding to a quantity of static random access memories included in the plurality of static random access memories, and
        each entry, of the quantity of entries, including:
            first information for identifying a memory bank, of a plurality of memory banks, associated with the plurality of static random access memories, and
            second information for identifying one or more registers associated with storing the data read from the plurality of static random access memories.

10. The non-transitory computer-readable medium of claim 8, where the one or more instructions to process the group of packets include:
    one or more instructions that, when executed by the at least one processor, cause the at least one processor to:
        determine, based on the data read from the plurality of static random access memories, one or more actions associated with processing the group of packets, and
        perform the one or more actions to process the group of packets.

11. The non-transitory computer-readable medium of claim 10, where the one or more instructions to perform the one or more actions include:
one or more instructions that, when executed by the at least one processor, cause the at least one processor to:
count the group of packets,
sample the group of packets, or
prioritize the group of packets relative to other packets.

12. The non-transitory computer-readable medium of claim 8, where the one or more instructions to simultaneously access the plurality of static random access memories include:
one or more instructions that, when executed by the at least one processor, cause the at least one processor to:
time division multiplex data read from two or more static random access memories, of the plurality of static random access memories, associated with a particular bus of a plurality of buses that connect the plurality of static random access memories to a group of registers used to store the data read from the plurality of static random access memories.

13. The non-transitory computer-readable medium of claim 8, where the instructions further comprise:
one or more instructions that, when executed by the at least one processor, cause the at least one processor to:
generate the lookup key based on a five-tuple of information included in a header of a packet included in the group of packets.

14. The non-transitory computer-readable medium of claim 8, where the instructions further comprise:
one or more instructions that, when executed by the at least one processor, cause the at least one processor to:
transmit the data read from the plurality of static random access memories via a group of buses,
a quantity of buses included in the group of buses being less than a quantity of static random access memories included in the plurality of static random access memories.

15. A method comprising:
accessing, by a network device and using a lookup key, a ternary content addressable memory to acquire a lookup result,
the lookup result including information identifying a plurality of addresses for accessing a plurality of static random access memories;
parsing, by the network device, the lookup result to identify the plurality of addresses;
simultaneously accessing, by the network device and using the plurality of addresses, the plurality of static random access memories, to simultaneously read data from the plurality of static random access memories; and
processing, by the network device, a group of packets based on the data read from the plurality of static random access memories.

16. The method claim 15, where the lookup result further includes:
a quantity of entries,
the quantity of entries being less than a quantity of static random access memories included in the plurality of static random access memories.

17. The method of claim 15, where processing the group of packets includes:
determining, based on the data read from the plurality of static random access memories, one or more actions associated with processing the group of packets, and
performing the one or more actions to process the group of packets, where the one or more actions include one or more of:
a first action for counting the group of packets,
a second action for sampling the group of packets, or
a third action for prioritizing the group of packets relative to other packets received by the network device.

18. The method of claim 15, where simultaneously accessing the plurality of static random access memories includes:
time division multiplexing data read from two or more static random access memories, of the plurality of static random access memories, associated with a particular bus of a plurality of buses that connect the plurality of static random access memories to a group of registers used to store the data read from the plurality of static random access memories.

19. The method of claim 15, further comprising:
transmitting the data read from the plurality of static random access memories via a group of buses,
a quantity of buses included in the group of buses being different from a quantity of static random access memories included in the plurality of static random access memories.

20. The method of claim 19, where transmitting the data includes:
selecting the group of buses, from a plurality of buses, based on data included in the lookup result; and
transmitting the data via the group of buses after selecting the group of buses.

* * * * *